Aug. 21, 1934.                G. B. WAGNER                1,970,720
                         REFRIGERATING APPARATUS
                          Filed Sept. 26, 1931
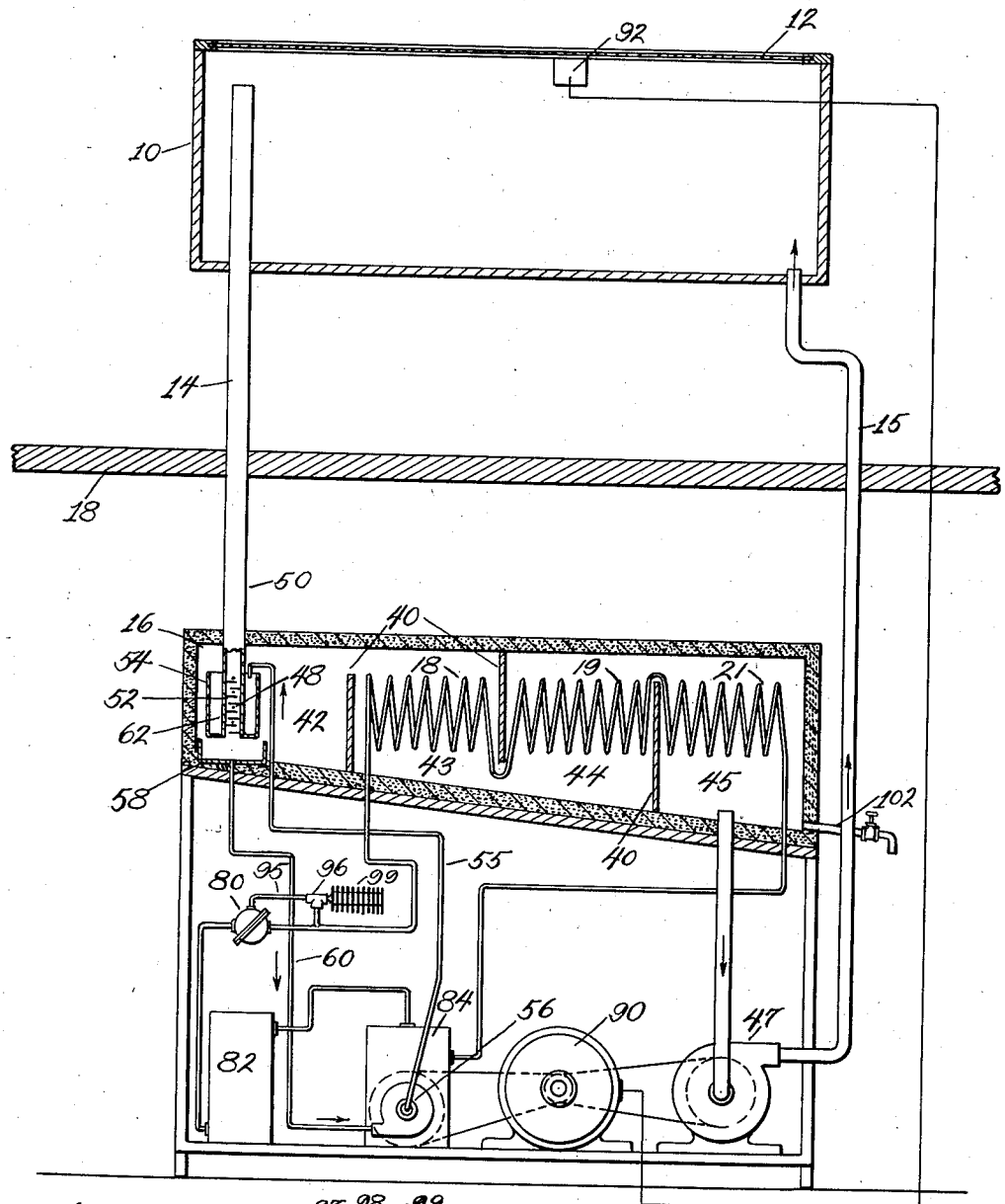

Patented Aug. 21, 1934

1,970,720

UNITED STATES PATENT OFFICE.

1,970,720

REFRIGERATING APPARATUS

George B. Wagner, Winchester, Mass., assignor to Francis R. Mullin, Winchester, Mass.

Application September 26, 1931, Serial No. 565,351

7 Claims. (Cl. 62—115)

This invention relates to a refrigerating apparatus.

One object of the invention is to provide novel and superior apparatus for refrigerating air, for de-humidifying the same, and for cooling it to a predetermined temperature.

A further object of the invention is to provide novel apparatus for maintaining the air within a storage chamber in a condition most suitable for the preservation of articles stored therein.

A still further object of the invention is to provide novel apparatus capable of maintaining the air within a storage chamber clean, substantially free from humidity, and between such limits of temperature as to thereby enable articles and particularly perishable articles to be stored in the chamber for a relatively long period of time without deteriorating.

With these objects in view and such others as may hereinafter appear, the invention consists in the apparatus and in the structures, arrangements and combinations of parts hereafter described and hereinafter defined in the claims at the end of this specification.

In the drawing I have illustrated the invention as embodied in apparatus for storing or displaying candy, wherein Fig. 1 is a sectional view of the apparatus, and Fig. 2 is a sectional detail of the expansion valve and associated mechanism for effecting the defrosting of the refrigerating coils.

In general the present invention is embodied in apparatus including a storage chamber within which it may be desired to store or display candy, meat, or any of the other articles which ordinarily deteriorate under humid and hot atmospheric conditions. The storage chamber is operatively connected through suitable conduits with an air refrigerating and dehumidifying chamber, comprising a chamber independent of the storage chamber and within which all of the refrigerating and dehumidifying operations are carried on.

The operation of the apparatus for refrigerating and dehumidifying the air is controlled from a thermostat located within the storage chamber, and provision is also made for effecting rapid defrosting of the refrigerating and dehumidifying apparatus in between the intervals in the intermittent operation of the same.

Referring now to the drawing, 10 represents a storage chamber herein shown as comprising a candy case with a glass top 12, and within which candy may be stored and displayed in a store in the usual manner. The storage chamber 10 is operatively connected by air inlet and outlet conduits 14, 15, to a refrigerating and dehumidifying chamber 16 which, as herein shown, may conveniently but not necessarily be located in the basement of the building, with the air conduits 14, 15 passing through the floor 180. The chamber 16 is preferably insulated and the bottom wall thereof arranged to extend downwardly for a purpose to be described.

Prior to the present invention, as far as I am aware, it has been impossible to store or display candy, and particularly chocolates, for any material length of time in hot or humid weather. The effect of both heat and humidity upon the candy has been to rapidly deteriorate it, soon rendering it unfit for sale. The present invention contemplates apparatus in which provision is preferably made for maintaining the air within the storage or display chamber 10 in a substantially dehumidified condition and within such limits of temperature that the candy may be stored for months without deteriorating.

As herein shown, the chamber 10 is subdivided by a series of spaced baffles 40 into a plurality of compartments 42, 43, 44 and 45. Individual sections 18, 19 and 21 of a refrigerating coil are located within the compartments. The air inlet conduit 14 is arranged to introduce the warmer humid air as it is drawn therethrough, into the compartment 42, while the dehumidified and cold air is withdrawn from the final compartment 45 through the outlet pipe 46 by the blower 47 and returned to the opposite end of the storage chamber 10. The air entering the compartment 42 is, as herein shown, first washed by being caused to pass through a mist produced by the flow of water through a series of small perforations 48 in the inner pipe 50 of an air-washer 52, formed by a surrounding jacket 54 into which water is returned through a discharge line 55 by a water pump 56. The latter is connected to a sump tank 58 by a pipe line 60, as shown. A series of baffles 62 within the washer 52 serve to deflect the air into intimate contact with the mist or finely divided spray of water, thus effectively washing the air. The wash water falls into the sump tank 58 and is again circulated by the pump back to the water jacket 54 to be used over again.

As the air leaves the washer 52 it passes upwardly over the first of the baffles 40, and into the upper portion of the second compartment 43, where it contacts with the first section 18 of the refrigerating coil. This section of the refrigerating coil is preferably refrigerated to a relatively low temperature, preferably in the neighborhood of zero degrees Fahrenheit, and as the air passes downwardly between the convolutions of the coil, a major portion of the moisture content of the air is deposited as frost upon the coil. The air in addition to being almost completely dehumidified, is also slightly cooled during its passage through the chamber 43, to an intermediate temperature of approximately 74 degrees Fahrenheit. Upon leaving the second compartment 43 the air is drawn upwardly through the third compartment 44 and through the convolutions of the second section 19 of the refrigerating coil. Within this section of the coil the temperature is approximately 20 degrees Fahrenheit, and the dehumidification of the air is completed during the passage of the air therethrough, and the air is cooled to approximately 40 degrees Fahrenheit.

After having passed upwardly through the third compartment, the air is drawn over the third of the baffles and downwardly through the fourth compartment 45, where it passes through the convolutions of the final section 21 of the coil. Within this section of the coil a temperature of approximately 10 degrees below zero is maintained, thereby effecting a cooling of the dry air down to approximately zero degrees Fahrenheit.

After the air has, in the manner described, been substantially completely dehumidified so that the relative humidity thereof is only a few percent., it is pumped by the pump 47 through the return pipe line 15 back to the storage or display chamber 10. In practice it is preferred to withdraw the air from and to return the air to the storage chamber 10, at different parts of the upper and lower portions respectively of the chamber 10, as illustrated in Fig. 1, whereby a whirling motion is imparted to the air within the chamber 10 over the surface of and into intimate contact with the candy or other goods being displayed or stored.

In order to produce the above described refrigeration within the successive sections 18, 19, 21 of the refrigerating coil, one end of the coil is piped to an expansion valve 80, and the latter is preferably piped to a condenser 82. The condenser 82 is piped to a compresser 84, and the low pressure side of the latter is connected by a pipe line to the second end of the refrigerating coil, as illustrated. The compresser 84, the water pump 56, and the blower for circulating the air are driven from a single motor 90 through driving connections, as illustrated, and the operation of the motor is preferably controlled from a thermostat 92 located in the storage or display chamber 10. During the refrigerating operation liquid refrigerant, such as liquid sulphur dioxide, under substantial pressure such as a pressure of 75 lbs. per square inch, is supplied from the condenser to the expansion valve 80, and upon expansion through the valve to a vacuum of ten inches of water, produces the requisite refrigeration within the first section 18 of the coil to bring the temperature of the refrigerant therein to approximately zero degrees Fahrenheit. The refrigerant begins to liquefy in the V-shaped bend between the first and second sections of the coil, and vaporization and expansion of the refrigerant occurs during the passage through the last two sections of the coil, producing temperatures of approximately 20 degrees Fahrenheit and minus 10 degrees Fahrenheit in said sections respectively.

During the operation of the apparatus, the refrigerating mechanism functions until the air in the storage or display chamber 10 has been cooled to a predetermined temperature and during each interval of operation a heavy frost accumulates upon the first section of the refrigerating coil. Provision is made for rapidly defrosting the coil during the interval between successive refrigerating operations and as herein shown the pressure side of the expansion valve 80 is connected by a pipe line 95 to a special T-fitting 96. The latter is connected into the low pressure side of the system beyond the valve 80 and is provided with a valve seat 97 into which a valve 98 actuated by a sylphon bellows 99 screwed into the T-fitting seats as diagrammatically illustrated in Fig. 2. A suitable spring 100 serves to hold the valve to its seat when the pressure within the bellows is below a predetermined point. With this construction as will be apparent from an inspection of Fig. 2, when the refrigerating operation ends, pressure immediately begins to rise on the low side of the system operating to expand the bellows and to open the valve, and allow liquid refrigerant at room temperature to flow from the high pressure side of the valve into the expansion or refrigerating coil, rapidly warming the same and defrosting the coil. In practice complete defrosting takes place within a few minutes, and when the refrigerating operation is resumed, the valve is automatically closed by the drop in pressure in the line. During operation therefore defrosting takes place between successive refrigerating operations and the apparatus maintained in a condition to operate with maximum efficiency.

The water resulting from the defrosting of the coil runs down the inclined bottom of the chamber 16, passing through suitable openings in the base of each baffle and is withdrawn from the chamber through an outlet pipe 102.

While the present invention may be used with advantage for storing or displaying candy, meat and other foods, nevertheless it may be used to condition the air within any storage chamber such as for fur storage, where the absence of humidity and a refrigerated atmosphere is desired.

Having thus described the invention, what is claimed is:

1. Apparatus of the character described having, in combination, a storage chamber provided with a thermostat, an air conditioning chamber, piping connections between the storage chamber and the air conditioning chamber, means for circulating air to withdraw it from the storage chamber, pass it through the air conditioning chamber, and return it to the storage chamber, refrigerating means within the air conditioning chamber capable of removing substantially the entire humidity from the air passing therethrough, connections between the thermostat and said refrigerating means for controlling the operation of the refrigerating means by the temperature within the storage chamber, and means for effecting rapid defrosting of the refrigerating means between intervals in the operation of the refrigerating means including means for admitting warm liquid refrigerant to the refrigerating means located within said air conditioning chamber when the operation of the refrigerating means is terminated.

2. Apparatus of the character described having, in combination, a storage chamber, an air conditioning chamber, connections between the storage and air conditioning chambers for effecting circulation of air from the storage chamber through the air conditioning chamber and back to the storage chamber, a refrigerating coil in said conditioning chamber, refrigerating mechanism including a compressor, piping connections between the compressor and the refrigerating coil, an expansion valve in said piping connections, and a pressure controlled by-pass for by-passing liquid refrigerant around said expansion valve and into said coil for effecting defrosting thereof during the intervals between the operation of the refrigerating mechanism.

3. Apparatus of the character described having, in combination, a storage chamber, an air conditioning chamber, connections between the storage and air conditioning chambers for effecting circulation of air from the storage chamber through the air conditioning chamber and back to the storage chamber, a refrigerating coil in said conditioning chamber, refrigerating mechanism located outside of said air conditioning chamber and exposed to room temperatures including a compressor, piping connections between the compressor and the coil, an expansion valve in said piping connections, and means operative automatically when the operation of the refrigerating mechanism is terminated for introducing liquid refrigerant at room temperature to within said refrigerating coil for defrosting the same.

4. Apparatus of the character described having, in combination, an air storage chamber, an air conditioning chamber, means including piping connections between said chambers for circulating air from the storage chamber through the air conditioning chamber and back to the storage chamber, means for washing the air admitted to the air conditioning chamber, a plurality of baffles within the air conditioning chamber arranged to subdivide the same into a plurality of refrigerating compartments, a refrigerating coil having a plurality of sections, one section being located in each refrigerating compartment, said baffles being arranged to direct the flow of air in a tortuous path and through successive sections of the refrigerating coil, refrigerating means located outside of said air conditioning chamber, and means operative automatically when the operation of the refrigerating mechanism is terminated for introducing liquid refrigerant at room temperature to within said refrigerating coil for defrosting the same.

5. Apparatus of the character described having, in combination, a storage chamber, an air conditioning chamber, connections between the storage and air conditioning chambers for effecting circulation of air from the storage chamber through the air conditioning chamber and back to the storage chamber, refrigerating mechanism including a coil provided with a plurality of sections located within the air conditioning chamber, baffles subdividing the chamber into a plurality of refrigerating compartments, with one section of the coil in each compartment, means for defrosting the refrigerating coil including means for introducing liquid refrigerant at room temperature to within the coil during the interval between successive operations of the refrigerating mechanism, and means for removing from the air conditioning chamber the water resulting from the defrosting operation including a downwardly inclined wall forming the bottom of the air conditioning chamber, and a drain located at the low point of said chamber.

6. Apparatus of the character described having, in combination, a storage chamber, an air conditioning chamber, connections between the storage and air conditioning chambers for effecting circulation of air from the storage chamber through the air conditioning chamber and back to the storage chamber, refrigerating mechanism including a plurality of sections of a coil, baffles subdividing the air conditioning chamber into a plurality of refrigerating compartments and arranged to permit air to pass upwardly over one baffle and under the next succeeding baffle, means for controlling the operation of the refrigerating mechanism in response to variations in the temperature of the air within the storage chamber, means for defrosting the refrigerating coil between intervals in the operation of the refrigerating mechanism, and an air washer for washing the air as it enters the air conditioning chamber.

7. In a refrigerating system in combination a refrigerating coil, means for producing refrigeration in the coil including a source of liquid refrigerant under pressure, an expansion valve, piping connections between the expansion valve and coil, and pressure responsive means for by-passing the liquid refrigerant around the expansion valve and into said coil for defrosting purposes.

GEORGE B. WAGNER.